US012663502B2

(12) United States Patent
Pratt et al.

(10) Patent No.: US 12,663,502 B2
(45) Date of Patent: Jun. 23, 2026

(54) RANGE FILTERING COMBINED WITH SUPPRESSION FILTERING FOR FULL-POLARIZATION CHARACTERIZATION RETENTION

(71) Applicant: University of Notre Dame du Lac, South Bend, IN (US)

(72) Inventors: Thomas G Pratt, South Bend, IN (US); Luke Saladis, South Bend, IN (US); Robert D Kossler, South Bend, IN (US)

(73) Assignee: University of Notre Dame du Lac, South Bend, IN (US)

( * ) Notice: Subject to any disclaimer, the term of this patent is extended or adjusted under 35 U.S.C. 154(b) by 290 days.

(21) Appl. No.: 18/439,384

(22) Filed: Feb. 12, 2024

(65) Prior Publication Data

US 2024/0272272 A1 Aug. 15, 2024

Related U.S. Application Data

(60) Provisional application No. 63/484,273, filed on Feb. 10, 2023.

(51) Int. Cl.
G01S 7/02 (2006.01)
G01S 7/35 (2006.01)

(52) U.S. Cl.
CPC ............ G01S 7/0231 (2021.05); G01S 7/354 (2013.01)

(58) Field of Classification Search
CPC ........ G01S 7/0231; G01S 7/354; G01S 7/024; G01S 7/36
See application file for complete search history.

(56) References Cited

U.S. PATENT DOCUMENTS

| | | | |
|---|---|---|---|
| 4,849,762 A | 7/1989 | Barnes | |
| 5,254,856 A | 10/1993 | Matsui | |
| 5,264,856 A | 11/1993 | Thurlow | |
| 5,649,287 A | 7/1997 | Forssen | |
| 5,691,727 A | 11/1997 | Cyzs | |
| 6,750,805 B1 | 6/2004 | Cameron | |
| 6,756,935 B1 | 6/2004 | Cameron | |
| 7,439,899 B2 | 10/2008 | Stagliano, Jr. | |
| 7,623,064 B2 | 11/2009 | Calderbank | |
| 9,348,022 B1 * | 5/2016 | Tomcsak | G01S 13/89 |
| 9,484,992 B2 | 11/2016 | Kang | |
| 10,623,075 B2 | 4/2020 | Pratt | |
| 10,955,524 B2 * | 3/2021 | Crane | G01S 13/5246 |
| 11,194,014 B1 | 12/2021 | Jackson | |

(Continued)

OTHER PUBLICATIONS

Non-final Office Action from U.S. Appl. No. 18/439,375, dated Dec. 16, 2025, 19 pp.

*Primary Examiner* — William Kelleher
*Assistant Examiner* — Kenneth W Good
(74) *Attorney, Agent, or Firm* — Greenberg Traurig, LLP

(57) ABSTRACT

A system and method for detecting targets with radar signals are disclosed which include a receiver configured to receive a radar signal on orthogonally-polarized channels and generate a receiver return vector from the received radar signal, a range filter configured to filter reflections in the receiver return vector at a selected range bin, and a polarization filter configured to filter an identified interference signal from a return of the range filter.

20 Claims, 15 Drawing Sheets
(9 of 15 Drawing Sheet(s) Filed in Color)

(56) References Cited

U.S. PATENT DOCUMENTS

2007/0047678 A1\* 3/2007 Sibecas .................. H04L 5/023
375/350
2020/0271772 A1 8/2020 Wang
2022/0011423 A1\* 1/2022 Li ........................... G01S 7/023

\* cited by examiner

100

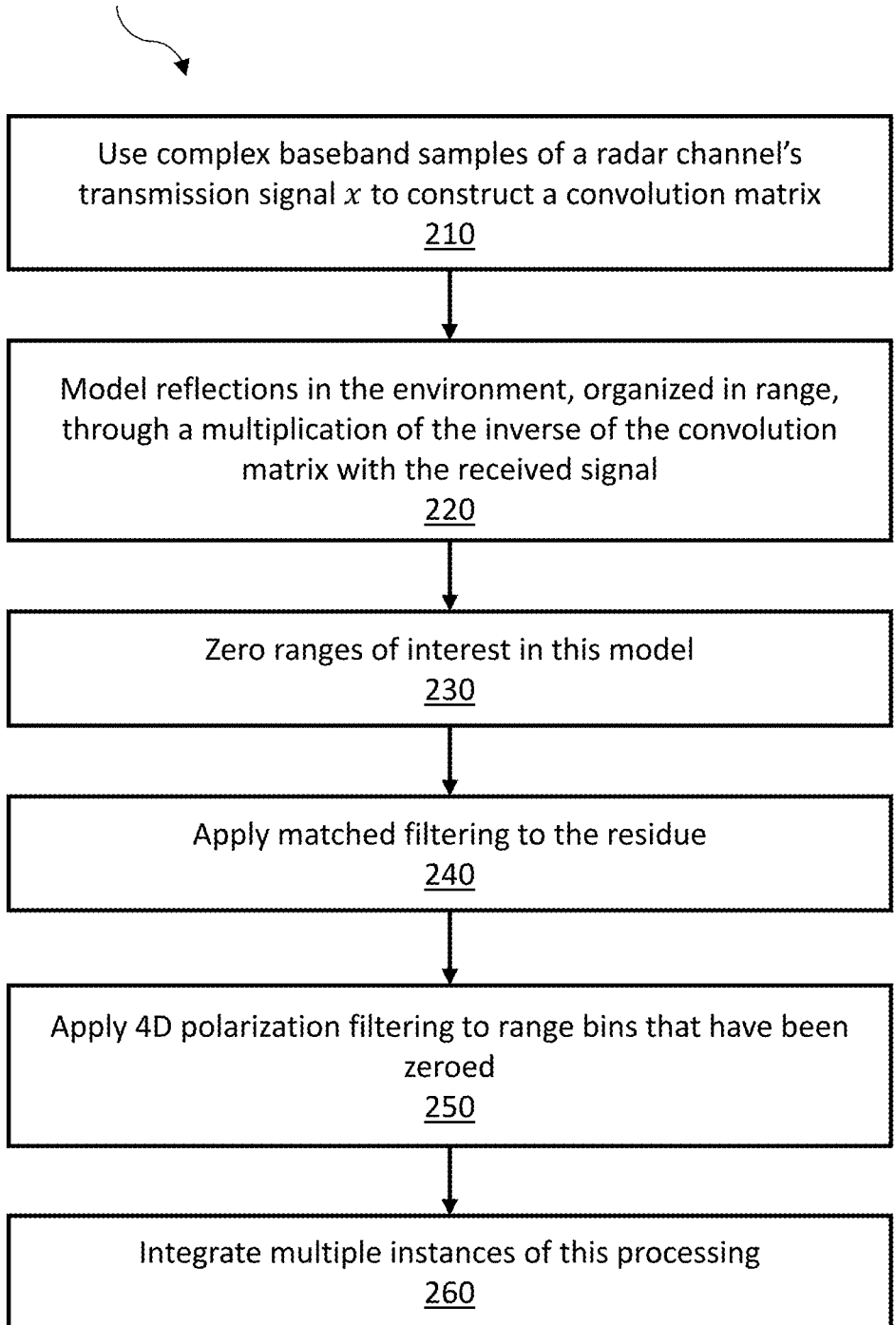

200

Use complex baseband samples of a radar channel's
transmission signal $x$ to construct a convolution matrix
210

Model reflections in the environment, organized in range,
through a multiplication of the inverse of the convolution
matrix with the received signal
220

Zero ranges of interest in this model
230

Apply matched filtering to the residue
240

Apply 4D polarization filtering to range bins that have been
zeroed
250

Integrate multiple instances of this processing
260

Fig. 2

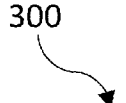

300

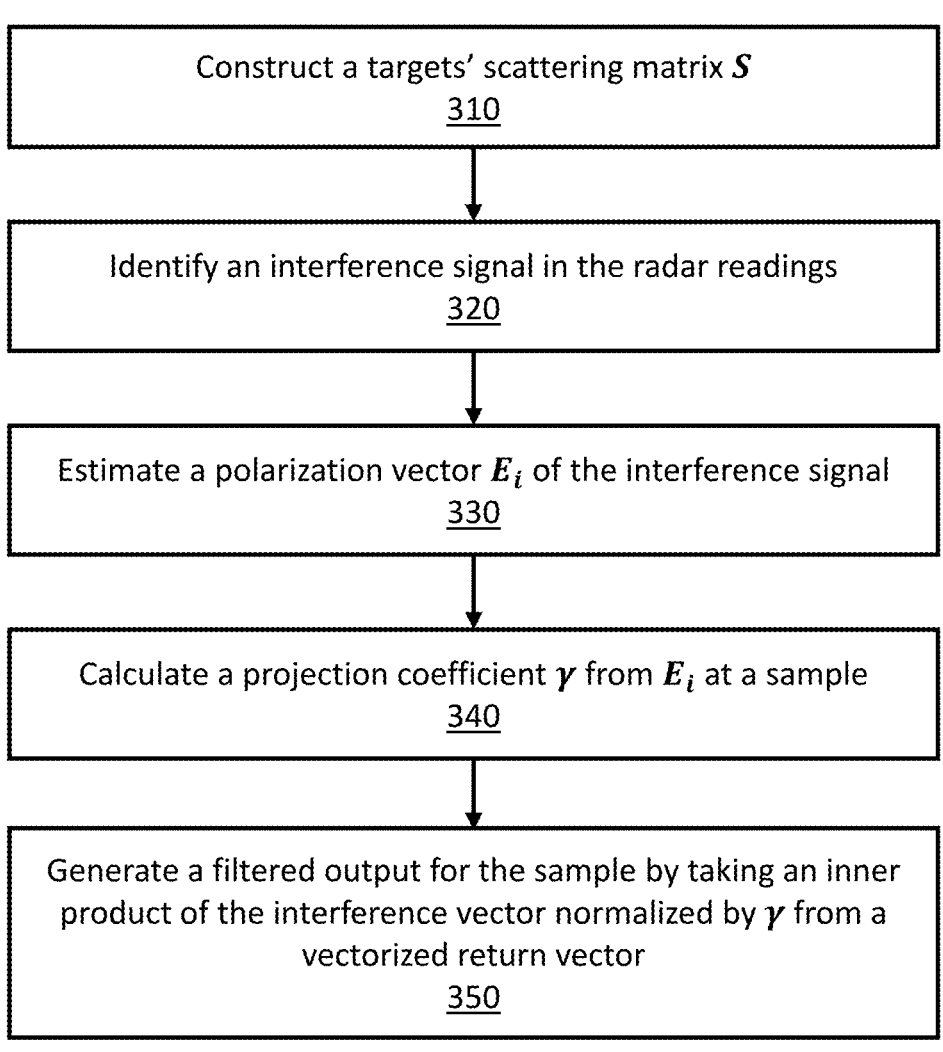

Construct a targets' scattering matrix $S$
310

Identify an interference signal in the radar readings
320

Estimate a polarization vector $E_i$ of the interference signal
330

Calculate a projection coefficient $\gamma$ from $E_i$ at a sample
340

Generate a filtered output for the sample by taking an inner product of the interference vector normalized by $\gamma$ from a vectorized return vector
350

Fig. 3

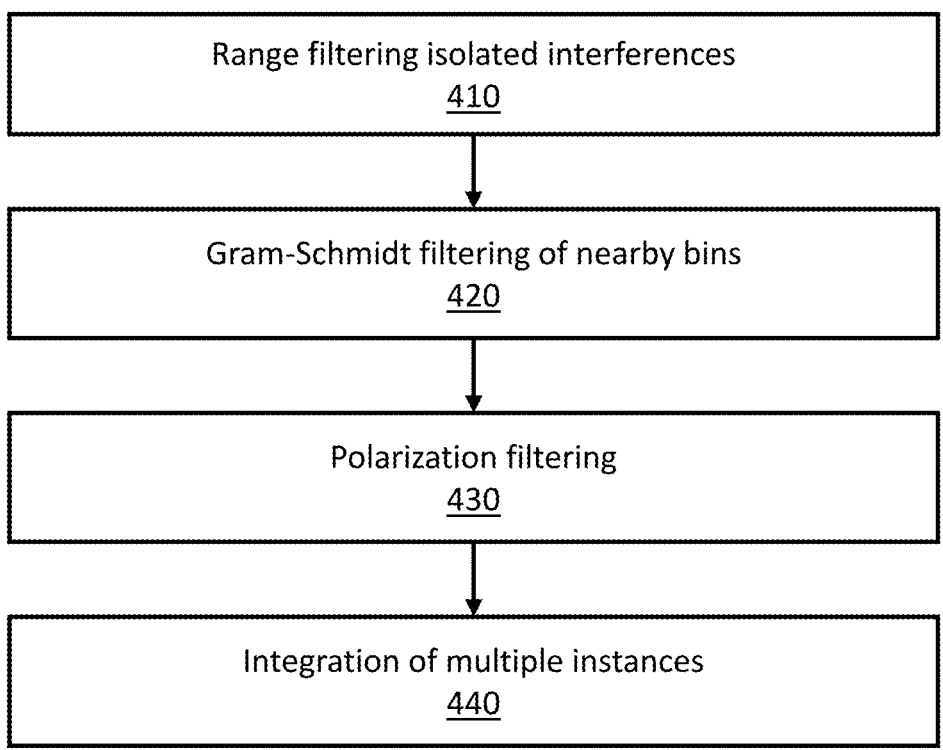
Range filtering isolated interferences
410
Gram-Schmidt filtering of nearby bins
420
Polarization filtering
430
Integration of multiple instances
440
Fig. 4

1100

1100

Range bin    110    112    115

RANGE FILTERING COMBINED WITH SUPPRESSION FILTERING FOR FULL-POLARIZATION CHARACTERIZATION RETENTION

CROSS-REFERENCE TO RELATED APPLICATIONS

This application claims priority to U.S. Provisional Application No. 63/484,273 filed on 10 Feb. 2023 and entitled "Range Filtering Combined with Suppression Filtering for Full-Polarization Characterization Retention" and is herein incorporated by reference in its entirety.

GOVERNMENT SUPPORT

This invention was made with government support under N00014-18-1-2134 awarded by the U.S. Office of Naval Research. The government has certain rights in the invention.

TECHNICAL FIELD

The present description relates to detecting, characterizing, and identifying targets through echo of electromagnetic wave, and more particularly to the application of range filtering and polarization filtering of the echo of electromagnetic wave.

BACKGROUND

A conventional polarization filter (CPF), also known as a single notch polarization filter (SNPF), allows for a known polarization state to be removed from a signal. This is essentially a two-dimensional polarized signal vector multiplied by an orthogonal two-dimensional vector. A resulting dot product effectively removes the designated polarization. This procedure is necessarily limited to a single polarization, as it consumes a sole degree of freedom. Multiple polarization can be performed with multi notch logic devices, through which either the individual notches are performed in parallel and then added or the polarizations are mixed and then the separation is performed. However, for either the single notch or multi notch polarization, a limitation is the complete removal of only a single polarization state.

These filtering approaches raise the question of how to know which polarization state to filter. Ideally, the filtered polarization state is associated with an interference signal or a statistical representation of a type of clutter and a corresponding estimate of what its polarized reflections will be. A related issue to the use of notch location to attenuate multiple polarizations is the issue of the attenuation of the desired signal response.

Null phase shift polarization filter (NPSPF) uses a combination of vector translations and filtering to minimize distortion in a selected polarization while completely removing another. Oblique projection polarization filter (OPPF) accomplishes complete removal with minimum distortion while loosening the conditions for success found in the NPSPF. These filters may require knowledge of two polarizations as opposed to only the interference polarization. The precision of such knowledge is also a useful aspect of filtering performance.

Some combination of all of these advances in polarization filtering with methods of finding the necessary polarizations can be found in the area of adaptive polarization filtering. Generally foreknowledge of clutter statistics or interference signal parameters is still needed to a greater or lesser degree, but the methods will still only be able to achieve a single ideal suppression, as all of these operations take place in two-dimensional polarization space.

As such, there is an identifiable desire for improvements in the features in or associated with filtering.

SUMMARY

A system and a method for detecting, characterizing and identifying targets in radar signals are disclosed which include a receiver configured to accomplish the following: receive a radar signal on orthogonally-polarized channels; apply matched filtering processing to elicit a range profile with initial target/clutter detections and determine ranges at which range filtering should be applied; reprocess the original signals with range filtering; apply matched filtering to the result of range filtering, which will exhibit noise artifacts at the suppressed ranges; optionally applying Gram-Schmidt filtering to adjacent range bins; applying 4D-polarization filtering to these noise components; and finally integrating multiple instances of this processing to reduce the noise through averaging so that target signals obscured by the noise amplification can be detected, characterized with a full-polarization characterization, and identified.

In implementations, the system and method further include a controller configured to repeat the filtering by the range filter and the polarization filter on a plurality of looks of the radar signals, and average returns of the polarization filter from the plurality of looks.

In implementations, the filtering by the range filter includes constructing a convolution matrix of a continuous wave transmission of the radar, modeling a reflection of the continuous wave transmission off of reflectors organized in range through a multiplication of the inverse of the convolution matrix with the received signal; zeroing ranges to be suppressed; applying matched filtering to the filter residue, which can lead to noise amplification at the suppressed range bins; applying polarization filtering to the amplified noise; and integrating multiple instances of this processing so that the noise component averages towards zero. The output of range filtering enables target detection, characterization, and identification.

In implementations, the convolution matrix is constructed based on complex baseband samples of the continuous wave transmission.

In implementations, the filtering by the polarization filter includes estimating a polarization vector of the identified amplified noise, calculating a projection coefficient from the amplified noise polarization vector at a sample of the range filter return, and generating an output of the polarization filter for the sample.

In implementations, the system and method further include a transmitter configured to transmit orthogonally-polarized incident radar signals.

In implementation, the receiver includes a matched filter to generate the range profile from the receiver return vector.

In implementations, the receiver return vector is obtained from four channels of a full polarimetric radar reading.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 is a flowchart illustrating an exemplary range filtering process.

FIG. 3 is a flowchart illustrating an exemplary Gram-Schmidt polarization filtering process.

FIG. 4 is a flowchart illustrating an exemplary combined filtering process.

DETAILED DESCRIPTION

Figure 1:
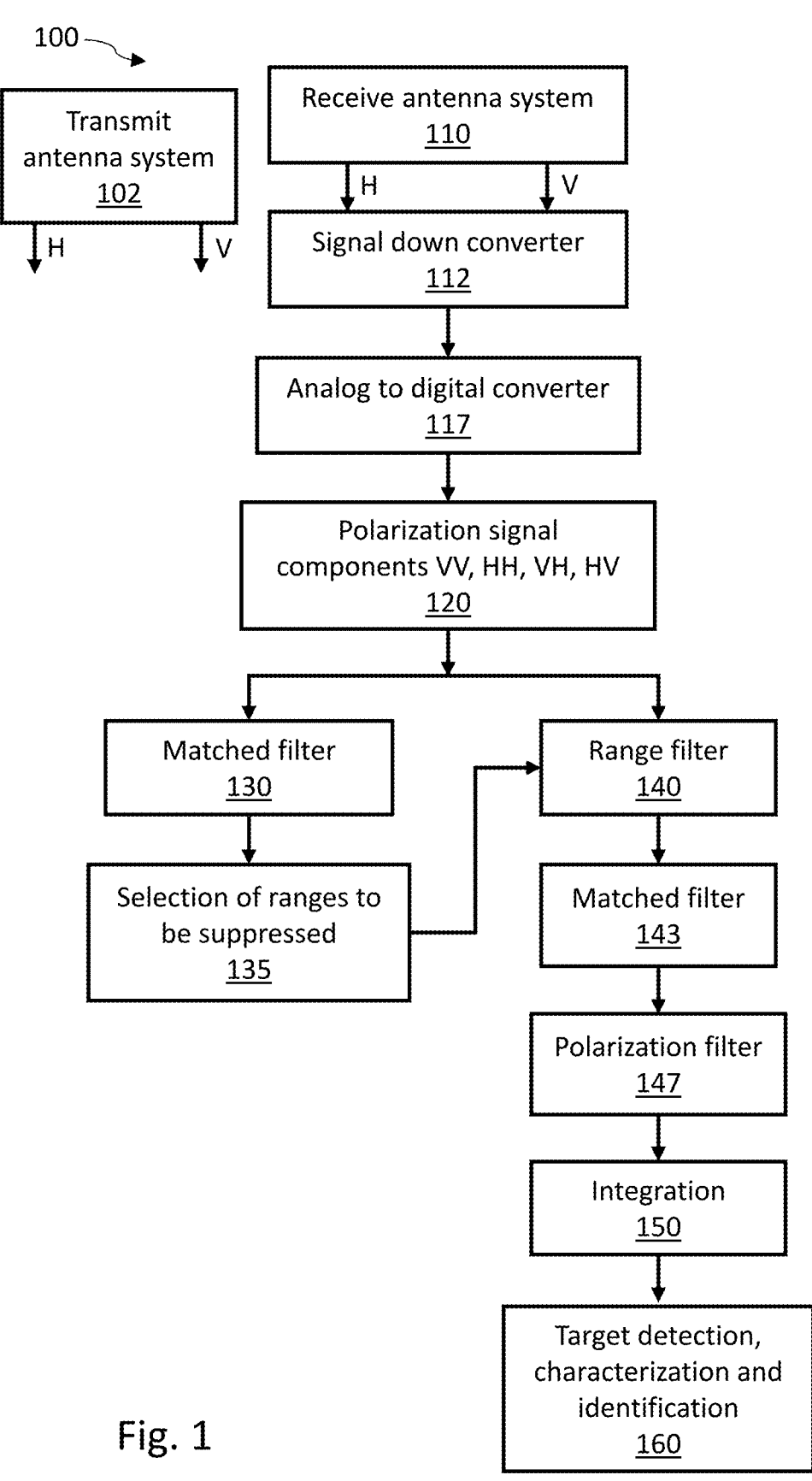
FIG. 1 is block diagram illustrating an exemplary radar system.

The present disclosure describes a full-polarized radar system employing both range filter and polarization filter to filter out interference echo signals. In present disclosure, the emphasis is on range filtering, i.e., zeroing out the responses at specific ranges in the environment. Because range filtering leads to the introduction of noise residues, the present disclosure utilizes 4D polarization filtering to suppress these unwanted components. It requires the integration of multiple instances of processing the radar signals in order to suppress these components. In the present disclosure, 4D filtering is used to suppress noise artifacts from the range filtering processing. Range filtering alone may not always be effective because of the noise amplification that occurs in the suppressed range bins. Range filtering with polarization filtering and integration provides a remedy.

The following description of example methods and apparatus is not intended to limit the scope of the description to the precise form or forms detailed herein. Instead the following description is intended to be illustrative so that others may follow its teachings.

A radar system creates polarized waves using an antenna that is designed to transmit and receive electromagnetic (EM) waves of a specific polarization. Antennas come in many forms, including horns, waveguides, dipoles and patches. In each case, the electric and mechanical properties of the antenna are such that the transmitted wave is almost purely polarized with a specific design polarization. In a simple radar system, the same antenna is often configured so that it is matched to the same polarization on reception (when an EM wave is incident upon it).

Control of signal polarization is possible by transmitting a signal coherently through two orthogonally-polarized antennas (basis polarizations) and controlling the relative amplitude and the relative phase between the signals. The two most common basis polarizations are horizontal linear or H, and vertical linear or V. Circular polarizations are also in use for some applications, e.g., weather radars. Their basis components are denoted by R for Right Hand Circular and L for Left Hand Circular. A circular polarized signal can be achieved using an H/V basis by feeding the H and V parts of the antenna simultaneously, with the same signal at equal strength and with a 90° phase difference.

In more complex radar systems, the antenna may be designed to enable simultaneous transmission and signal reception at more than one polarization. Signal processing at the receiver can be utilized to separate the responses from the at-least two transmitted signals.

The radar antenna may be designed to receive the different polarization components of the EM wave simultaneously. For example, an H and V polarization basis can be used at the receiver to receive the two orthogonal components of the incoming wave.

As one example, denoting the transmit and receive polarizations by a pair of symbols, a radar system using H and V linear polarizations can thus have the following channels:

HH—for horizontal transmit and horizontal receive,

VV—for vertical transmit and vertical receive,

HV—for horizontal transmit and vertical receive, and

VH—for vertical transmit and horizontal receive.

The first two of these polarization combinations are referred to as co-polarized, because the transmit antenna component and the received antenna component have the same polarization. The last two combinations are referred to as cross-polarized because the transmit antenna polarization and the receive antenna polarization are orthogonal to one another.

A radar system can have different levels of polarization complexity:

single polarized—HH or VV or HV or VH dual polarized—HH and HV, VV and VH, or HH and VV four or full polarizations—HH, VV, HV, and VH A full-polarization (i.e. polarimetric) radar uses these four responses, and measures the phase difference between the channels as well as the magnitudes. Some dual polarized radars also measure the phase difference between channels, as this phase may play a role in polarimetric information extraction.

FIG. 1 is block diagram illustrating an exemplary radar system 100 according to implementations of the present disclosure. The exemplary radar system 100 includes a transmit antenna system 102, a receive antenna system 110, a signal down converter 112, an analog-to-digital converter 117, polarization signal components (VV, HH, VH, HV) unit 120, a matched filter 130, a unit of selection of ranges to be suppressed 135, a range filter 140, another matched filter 143, a polarization filter 147, an integration unit 150 and a target detection, characterization and identification unit 160.

In implementations, transmit antenna system 102 transmits radio frequency (RF) signals with horizontal (H) and vertical (V) polarization. Receive antenna system 110 receives reflected signals. Mostly directive antennas are used because of its property of collecting a weak echoed signal. A target within a range of the radar system 100 can be detected when a transmitted signal reflected by the target is received.

In implementations, the received signals are processed by signal down converter 112 to down-convert the RF signal to complex baseband. Analog-to-digital convertor 117 converts the received RF signals to digital signals which are fed into the unit of polarization signal components (VV, HH, VH, HV) 120. Matched filter 130 and selection unit 135 process each channel (VV, VH, HV, HH) to determine where range filtering needs to be applied. Then range filter 140 applies range filtering on each channel (VV, VH, HH, HV). The range filtered signals are then filtered by matched filter 143 and polarization filter 147.

Polarization is a property of transverse waves that refers to the geometric orientation of the oscillations of the corresponding wave. The radiation field of an antenna is composed of electric and magnetic lines of force. In this field emitted by an antenna, the lines of force of the electric field are perpendicular to the magnetic field. Both field components depend on the position of the antenna relative to the earth's surface. The direction of the electric field determines the direction of the polarization of the electromagnetic wave. Full-polarization radar transmission signals refer to the use of both horizontal and vertical polarizations in radar signals.

In implementations, radar system 100 as shown in FIG. 1 employs range filter 140 to eliminate reflections in the output of matched filter 130, including their range-domain side lobes, from a target at a designated range bin or at multiple range bins. Range filter 140 can operate over a single transmission cycle and eliminate the designated reflections. The range filtering process conceivably enables target isolation to facilitate target characterization, because this process leaves reflectors from other ranges completely unaltered.

A limitation of the range filtering process, however, is the introduction of noise artifacts at the processed range(s) and the associated sidelobes. These residues will generally be larger than even moderate targets and may be greater in magnitude than even large targets. The residues therefore constitute a substantial impediment to the goals of target detection and characterization.

To overcome the aforementioned limitation, radar system 100 as shown in FIG. 1 further employs polarization filter 147 to suppress these residues. Polarization filter 147 operates in the polarization dimension on full polarimetric radar returns. In implementations, polarization filter 180 is a Gram Schmidt polarization filter (GSPF). When matched filter 143 outputs are weighted with adapted coefficients (tuned to a specific matched GSPF state) and then combined, the filter will suppress signals according to how well matched they are to the notched state. This method can also be applied with effectiveness in a single transmission cycle.

The aforementioned steps are performed on multiple pulses so that results can be integrated by integration unit 150. Unit 160 of the radar system 100 then performs target detection, characterization and identification on the integrated data.

As with filtering in range, there are also drawbacks associated with polarization filtering. First unlike range filtering which can be applied to any number of range locations, the GSPF can only be applied to a maximum of three specified states. Second, also unlike range filtering, the application of the GSPF will alter the values of the reflection coefficients in ranges other than other designated for filtering. These limitations stem from the fact that the GSPF orthogonalizes the filter output to the polarizations used to form filter coefficients. This orthogonalization completely removes the designated polarizations, but as the space is of four dimensions any more than three polarizations will eliminate all returns in the space. Also due to this orthogonalization, all of the polarization states not targeted by the filter will have their projections onto that polarization subtracted. This subtraction will alter all polarizations that are not already orthogonal to the eliminated polarization.

These two methods of target elimination in some ways have complementary shortcomings. Noise residues from range filtering can be very large, but their values are based on noise. This should lead to random values for the residues and little or no correlation between residues from cycle to cycle (look to look), and hence can be reduced through integration. Gram Schmidt polarization filtering will attenuate part of the desired response, but it will eliminate the interference completely. This leads to the basic idea behind the proposed processing combination. Range filtering is used to remove a target or targets at a specified location and their corresponding side lobes to enhance targets at other ranges. The range filtering process yields a residue at the specified range. Gram Schmidt polarization filtering can then be used to suppress those residues. The GSPF will also remove the corresponding projection from targets. This will potentially degrade detection and will certainly hamper true polarimetric target characterization. If this process is repeated on another cycle, however, the new residue should have a low correlation with the previously filtered residue. So again in this new GSPF output there will be unwanted attenuation in the returns, but this attenuation should be, with some caveats to be explored later, uncorrelated from the previous one. If the process is repeated over multiple cycles and the results averaged the expectation of the filtered ranges is zero, every look it is completely removed. The other ranges will have an expectation of, with some caveats again, their original scattering matrix without the side lobe interference of the removed target.

FIG. 2 is a flowchart illustrating an exemplary range filtering process 200. Range filtering process 200 begins with constructing complex baseband samples of a radar channel's transmission signal x in block 210:

$$x = [\, x_0 \quad x_1 \quad \cdots \quad x_{N-1} \,]^T \qquad \text{(Eq. 1)}$$

where N is the total number of samples in a transmission cycle.

In block 220, the range filtering process 200 constructs a convolution matrix X of an exemplary continuous wave radar based on the complex baseband samples. The convolution matrices are square and of the below form $$X = \begin{bmatrix} x_0 & x_{N-1} & x_{N-2} & \cdots & x_1 \\ x_1 & x_0 & x_{N-1} & \cdots & x_2 \\ \vdots & \vdots & \vdots & \vdots & \vdots \\ x_{N-1} & x_{N-2} & x_{N-3} & \cdots & x_0 \end{bmatrix}^T \qquad \text{(Eq. 2)}$$

Convolution of discrete values can be represented through matrix multiplication. In block 230, range filtering process 200 models a reflection of the continuous wave transmission off of reflectors organized in range with a multiplication of matrix X with a vector α which is environmental reflection coefficients by sample delay, where $$a = [\, a_0 \quad a_1 \quad \cdots \quad a_{N-1} \,]^T \qquad \text{(Eq. 3)}$$

In block 240, radar signal reflections from the targets in the environment results in a return r, which will also include the addition of random complex quantities for noise, z. The return can be expressed as $$r = Xa + z \qquad \text{(Eq. 4)}$$

Conventionally, matched filtering would be applied to this return to generate the range profile. However, range filtering introduces additional processing prior to the matched filtering operation.

Since matched filtering is a convolution operation, it can be represented using linear algebra as $$y = X^H r = X^H Xa + X^H z \qquad \text{(Eq. 5)}$$

Note that a first entry of the matched filter output can be expressed as $$y_0 = a_0\left(x_0^H x_0\right) + a_1\left(x_0^H x_1\right) + \dots + a_{N-1}\left(x_0^H x_{N-1}\right) + x_0^H z \qquad \text{(Eq. 6)}$$

where $x_i$ corresponds to the $l^{th}$ column of the convolution matrix. The source of side lobe interference can be seen. For $y_0$ the reflector of interest is $a_0$ but there are contributions from every element of the reflection's vector a. Range filtering 200 then seeks to reduce the contribution of other elements of a in the entries of y by inverting the convolution matrix and setting specific entries of a to zero. Specifically a vector $r_z$ is created. If the $l^{th}$ reflector is to be zeroed then $$r_z = \begin{bmatrix} I_{l-1} & & \\ & 0 & \\ & & I_{N-1} \end{bmatrix} X^{-1} r = \begin{bmatrix} I_{l-1} & & \\ & 0 & \\ & & I_{N-1} \end{bmatrix}\left(a + X^{-1}z\right) \qquad \text{(Eq. 7)}$$

Now the unwanted reflectors are zeroed and re-convolution can take place through matrix multiplication.

$$r_p = Xr_z \qquad \text{(Eq. 8)}$$

When matched filtering is applied to $r_p$, i.e., $$y^m = X^H r_p \qquad$$

the side lobes from the reflector a will be completely removed. However, as can be seen in Eq. 7, the inner product between the noise vector z and the $l^{th}$ row of the inverse convolution matrix, $$x_l^j,$$

will remain phase aligned with the $l^{th}$ range index. The expectation of this value is $$\mu_{residue} = E\left(x_l^j \cdot z\right) = E\left(\sum_{j-0}^{N-1} X^{-1}(l, j)z(j)\right) = \mu_z\left(\sum_{j-0}^{N-1} X^{-1}(l, j)\right) \qquad \text{(Eq. 9)}$$

where $\mu_z$ is the expectation of the noise vector z.

Since the value is dependent on the noise vector, it will be random and low correlations are expected between looks.

FIG. 3 is a flowchart illustrating an exemplary Gram-Schmidt (GS) polarization filtering process 300. With dual orthogonal polarized receive and transmit antenna, it is possible to take full polarimetric radar collections. Full polarization is referring to the scattering matrix description of radar targets. The response from a particular target to a vertically polarized transmission wave is given by the signals received on the horizontal and vertical receive antennas. The same is true for a horizontal transmission wave. Additionally, the responses are in general not the same. This is true of any two dimensional orthogonal basis polarizations.

For a two dimensional orthogonal basis with x and y components, the response from the target is given by targets' scattering matrix S. The GS polarization filtering process 300 begins with constructing such targets' scattering matrix S:

$$S = \begin{bmatrix} s_{xx} & s_{yx} \\ s_{xy} & s_{yy} \end{bmatrix} \qquad \text{(Eq. 10)}$$

The aforementioned vector $\alpha$ is replaced by four vectors $s_{ij}$ for each polarimetric channel, as four channels provides a full-polarimetric radar reading. The four return vectors, $r_{xx}$, $r_{xy}$, $r_{yx}$ and $r_{yy}$, will again be the result of convolution between the transmitted signal and the reflectors expressed in below equations.

$$\begin{aligned} r_{xx} &= x_x(n) * s_{xx}(n) \\ r_{xy} &= x_x(n) * s_{xy}(n) \\ r_{yx} &= x_y(n) * s_{yx}(n) \\ r_{yy} &= x_y(n) * s_{yy}(n) \end{aligned} \qquad \text{(Eq. 11)}$$

The returns as a whole can be vectorized as $$r(n) = \begin{bmatrix} r_{xx}(n) & r_{xy}(n) & r_{yx}(n) & r_{yy}(n) \end{bmatrix}^T \qquad \text{(Eq. 12)}$$

The GS polarization filter (GSPF) can be applied either pre or post matched filtering. As an example, a four dimensional post matched filtering vector can be constructed by applying matched filtering to each of the channels to create $$y(n) = \begin{bmatrix} y_{xx}(n) & y_{xy}(n) & y_{yx}(n) & y_{yy}(n) \end{bmatrix}^T \qquad \text{(Eq. 13)}$$

here, n is indexing across range. As there are side lobes present, each range will be a composition of many polarizations.

In block 320, an interference signal in the radar readings is identified. Then a polarization vector $E_i$ of the interference signal is estimated in block 330.

If the polarization to be removed is $E_i$, then the remainder, s(n), of the signal can be described as s(n)=r(n)−$E_i$(n). Or $$y(n) = E_i(n)\begin{bmatrix} E_{ixx} \\ E_{ixy} \\ E_{iyx} \\ E_{iyy} \end{bmatrix} + S(n)\begin{bmatrix} s_{xx} \\ s_{xy} \\ s_{yx} \\ s_{yy} \end{bmatrix} \qquad \text{(Eq. 14)}$$

If the interference vector $[E_{ixx}\ E_{ixy}\ E_{iyx}\ E_{iyy}]T$ is known, then following the Gram-Schmidt procedure, the component of all vectors that align with the above interference vector can be eliminated.

In block 340, a projection coefficient $\gamma$ is calculated at a particular sample n $$\gamma(n) = \frac{1}{|E_i|^2}\begin{bmatrix} E_{ixx}^* & E_{ixy}^* & E_{iyx}^* & E_{iyy}^* \end{bmatrix}\begin{bmatrix} y_{xx}(n) \\ y_{xy}(n) \\ y_{yx}(n) \\ y_{yy}(n) \end{bmatrix} \quad \text{(Eq. 15)}$$

In implementation, a four-dimensional polarization filter is configured to arrange the return vector in a column of four elements according to polarimetric positions of respective channels, and derive a projection coefficient by dividing the inner product by a magnitude of the interference vector, $E_i$, as expressed in Eq. 15.

In block 350, a filtered output for the sample n is generated by taking an inner product of the interference vector, Et, normalized by $\gamma$ from the return vector r(n) as expressed in below equation.

$$h(n) = r(n) - \gamma(n)\begin{bmatrix} E_{ixx} \\ E_{ixy} \\ E_{iyx} \\ E_{iyy} \end{bmatrix} \quad \text{(Eq. 16)}$$

Eq. 16 expresses that the filter output is produced by subtracting a product of the projection coefficient and the selected vector from the column of the return vector.

GS filtering process 300 can be examined by looking at the effect on two components of the matched filter vector as described in Eq. 14. First, the projection coefficient $\gamma$ of the to-be-removed interference portion is calculated $$\gamma_E(n) = \frac{1}{|E_i|^2}\begin{bmatrix} E_{ixx} \\ E_{ixy} \\ E_{iyx} \\ E_{iyy} \end{bmatrix}^H E_i(n)\begin{bmatrix} E_{ixx} \\ E_{ixy} \\ E_{iyx} \\ E_{iyy} \end{bmatrix} = E_i(n) \quad \text{(Eq. 17)}$$

Similarly, projection coefficient of the untargeted portion is calculated as following:

$$\gamma_S(n) = \frac{1}{|E_i|^2}\begin{bmatrix} E_{ixx} \\ E_{ixy} \\ E_{iyx} \\ E_{iyy} \end{bmatrix}^H S(n)\begin{bmatrix} s_{xx} \\ s_{xy} \\ s_{yx} \\ s_{yy} \end{bmatrix} = S(n)\frac{|S(n)||E_i(n)|\cos(\theta)}{|E_i|^2} \quad \text{(Eq. 18)}$$

where $\theta$ is an angle between $E_i$ and S.

Then the GSPF output can be calculated by component $$h(n) = E_i(n)\begin{bmatrix} E_{ixx} \\ E_{ixy} \\ E_{iyx} \\ E_{iyy} \end{bmatrix} + S(n)\begin{bmatrix} s_{xx} \\ s_{xy} \\ s_{yx} \\ s_{yy} \end{bmatrix} - (\gamma_E(n) + \gamma_S(n))\begin{bmatrix} E_{ixx} \\ E_{ixy} \\ E_{iyx} \\ E_{iyy} \end{bmatrix} = \quad \text{(Eq. 19)}$$

$$S(n)\left(\begin{bmatrix} s_{xx} \\ s_{xy} \\ s_{yx} \\ s_{yy} \end{bmatrix} - \frac{|S(n)||E_i(n)|\cos(\theta)}{|E_i|^2}\begin{bmatrix} E_{ixx} \\ E_{ixy} \\ E_{iyx} \\ E_{iyy} \end{bmatrix}\right)$$

This result shows the complete elimination of $E_i$ as desired, but also present is the undesired effect of the subtraction from S of its projection onto $E_i$. This subtraction of the projection is a feature of orthogonal polarization filters. This is an area where turning to four dimensional filtering also possesses an advantage. The Gram Schmidt process is generally used to create orthonormal basis. The GSPF uses the vectors to be filtered to create basis elements of the given size. For example, if three polarizations are to be filtered, the GSPF will create an orthonormal basis for a three dimensional space containing those polarizations which will then be used to remove signal projections associated with this basis.

Let $\omega$ represents the polarization to be removed and let $\omega$ along with vectors $b_1$, $b_2$ and $b_3$ form an orthonormal basis in four dimensions. Any polarization, P, when appropriately weighted with the complex coefficients $c_0$, $c_1$, $c_2$ and $c_3$, can be represented in the orthonormal basis as $$P = c_0\omega + c_1 b_1 + c_2 b_2 + c_3 b_3 \quad \text{(Eq. 20)}$$

When viewed in this way, it can be seen that the portion of P removed will correspond to $c_0$. Since there is no assumptions about the polarizations being made, it can be said that in general $$E\left(\frac{|c_0|}{|P|}\right) = \frac{1}{4} \quad \text{(Eq. 21)}$$

Since the weighting on any basis vector is equally likely. Of course this is an improvement over two dimensional filtering where the expectation would be ½.

Examining the matched filter result (as in Eq. 6) that will form a filter coefficient, it is evident that a portion of the estimate will be correlated with other target polarizations within the side lobes of the polarization at the filtered range. One of the coefficients used to form a GSPF filtering vector will be taken from a single channel's matched filter vector. This, however, generalizes across channels and polarizations. If the target at the $l^{th}$ range index is to be removed and there is one other target present at the $k^{th}$ range index, the corresponding coefficient estimate will be $$y_l = a_l(x_l^H x_l) + a_k(x_l^H x_k) + x_l^H z \quad \text{(Eq. 22)}$$

So, an expectation can be added to the term associated with side lobe contributions:

$$E\left(\frac{|c_0|}{|P|} + \frac{|x_l^H x_k|}{|x|^2}\right) = \frac{1}{4} + \frac{|x_l^H x_k|}{|x|^2} \qquad \text{(Eq. 23)}$$

which will depend on the waveform and distance between the targets.

To address the issue of filter coefficient estimation and alleviate some of the polarimetric changes and reflection attenuation associated with the use of filters, a method employing a combination of three filters is used. This method first uses Range Filtering on the range bins where the interference to be removed is located. Next a matched filter is applied which will have noise residues at those range bins. Then a series of Gram Schmidt filters are applied to a range of columns of the convolution matrix. These columns are filtered across polarimetric channels. This produces an isolated matched filter polarimetric reading for the bins containing noise peaks. A polarimetric reading can then be taken on the noise peaks. The use of the Gram Schmidt filters before the reading will eliminate the side lobes of nearby reflectors from the filter coefficients. Now a Gram Schmidt Polarization Filter can be applied to the unaltered range filter outputs. This will polarimetrically eliminate the noise peaks. This will also effect the other polarizations present. This process can be repeated with a random polarization (derived from the noise) being filtered at each cycle. Due to the random nature of the polarizations being filtered the averaged effect on the remaining polarizations should be less. Additionally removing near inside lobes before taking the estimate should also mitigate the effects of using matched filter outputs to find the filtering polarization. These steps can be examined in a more detailed manner.

FIG. 4 is a flowchart illustrating an exemplary combined filtering process 400. Combined filtering process 400 begins with range filtering isolated interferences in step 410. When particular reflectors and their location in range are identified, a first step is to apply a range filter as depicted in FIG. 2 and associated descriptions. Since the filter output will be fed into a polarization filter the number of bins range filtering can be applied to is limited. Two bins for a two dimensional polarization reading or four bins for four dimensions. Here the bins refer to radar channels.

Combined filtering process 400 then proceeds to Gram-Schmidt filtering of nearby bins in step 420. The polarimetric reading of the noise residues that will result from the application of the range filters in step 410 is needed. In implementations, these readings will be obtained by using a matched filter to find the relative weighting of the channels. By applying a Gram-Schmidt filter to the columns of the appropriate convolution matrix columns this polarimetric reading can remove the bias in the reading by removing the side lobes from surrounding targets. More specifically if the $l^{th}$ range bin is to be filtered on a channel, and it is desired to remove the influence of the 2g nearest targets on the estimation, then filter coefficients can be formed by the columns l–g, l–g+1, . . . , l–1, l+1, . . . , l+g of the convolution matrix. Then just as would be done if the coefficients were made from polarimetric readings, the Gram-Schmidt filtering process is performed on the unfiltered returns.

In implementations, step 420 is repeated on all channels. The attenuation on the $l^{th}$ range bins matched filter output will be uniform across all polarimetric channels, so there will be no change in the polarization filter formed from reading its outputs. This is because the attenuation is directed related to the waveform.

After the steps 410 and 420 are complete the processed returns will be matched filtered and the readings from the desired bins will be taken. These will then be used to form and then perform the polarization filtering in step 430. This polarization filtering can be done on the matched filter outputs themselves or the processed returns used to get the readings. Which option will depend on how it is desired to integrate the multiple looks that will be taken.

Step 440 is a repetition of the filtering of steps 410-430. As each cycle's (or look's) polarization filter will be dependent on that cycle's instantiation of the noise it will be a random value. Further the correlation between filters will be small. This enables averaging of the polarization returns of the multiple looks where in each look the interference will be zero and the loss of non-filtered objects should also tend towards zero.

Figure 5:
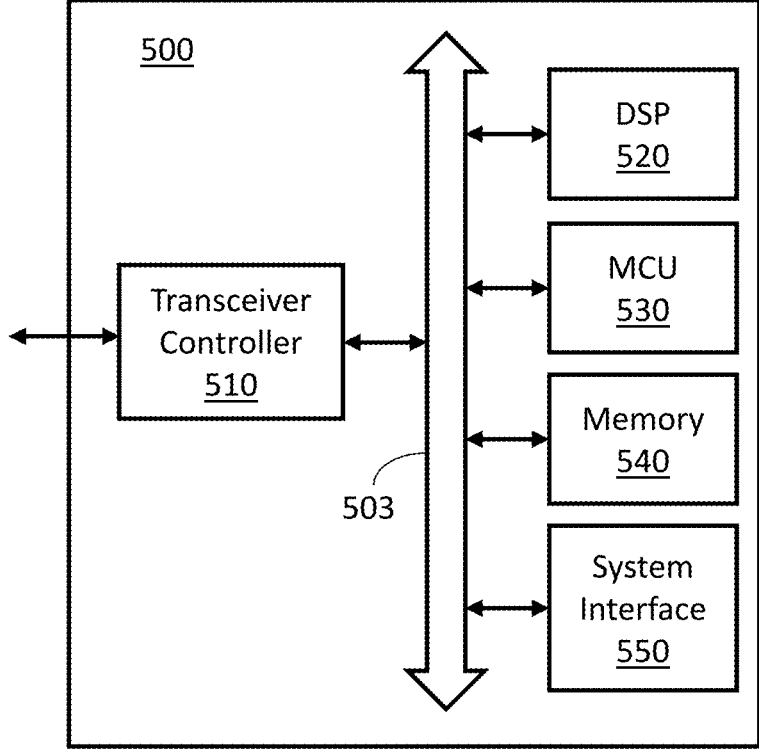
FIG. 5 is a block diagram of a radar transceiving and processing system for implementing the processes shown in FIGS. 2-4.

FIG. 5 is a block diagram of a radar transceiving and processing system 500 for implementing the processes shown in FIGS. 2-4. As an example, the radar transceiving and processing system 500 includes a transceiver controller 510 coupled, through a bus 503, to a digital signal processor 520, a microcontroller unit 530, a memory 540 and a system interface 550. The transceiver controller 510 controls the transmission and receiving of multiple polarization radar signals. Data collected by the transceiver controller 510 is passed to digital signal processor 520 and microcontroller unit 530 for filtering and data processing depicted in FIGS. 2-4. Programmed instructions for performing the filtering and data processing are stored in memory 540. Processed return data is outputted through system interface 550.

In other implementations, the filtering and processing functions depicted in FIGS. 2-4 can be performed by hardware constructed from field programmable gate array (FPGA) or application-specific integrated circuit (ASIC). Such hardware implementation has the advantage of processing speed but may not have the flexibility of a software implementation.

To give a step by step demonstration of the processing including the combined filtering of the present disclosure, a simple simulation is employed, and results are presented in FIGS. 6-10. In this simulation there is a large first target at range index 100 impeding detection of a second target located at index 102. The second target is also referred to as a masked target.

Figure 6:
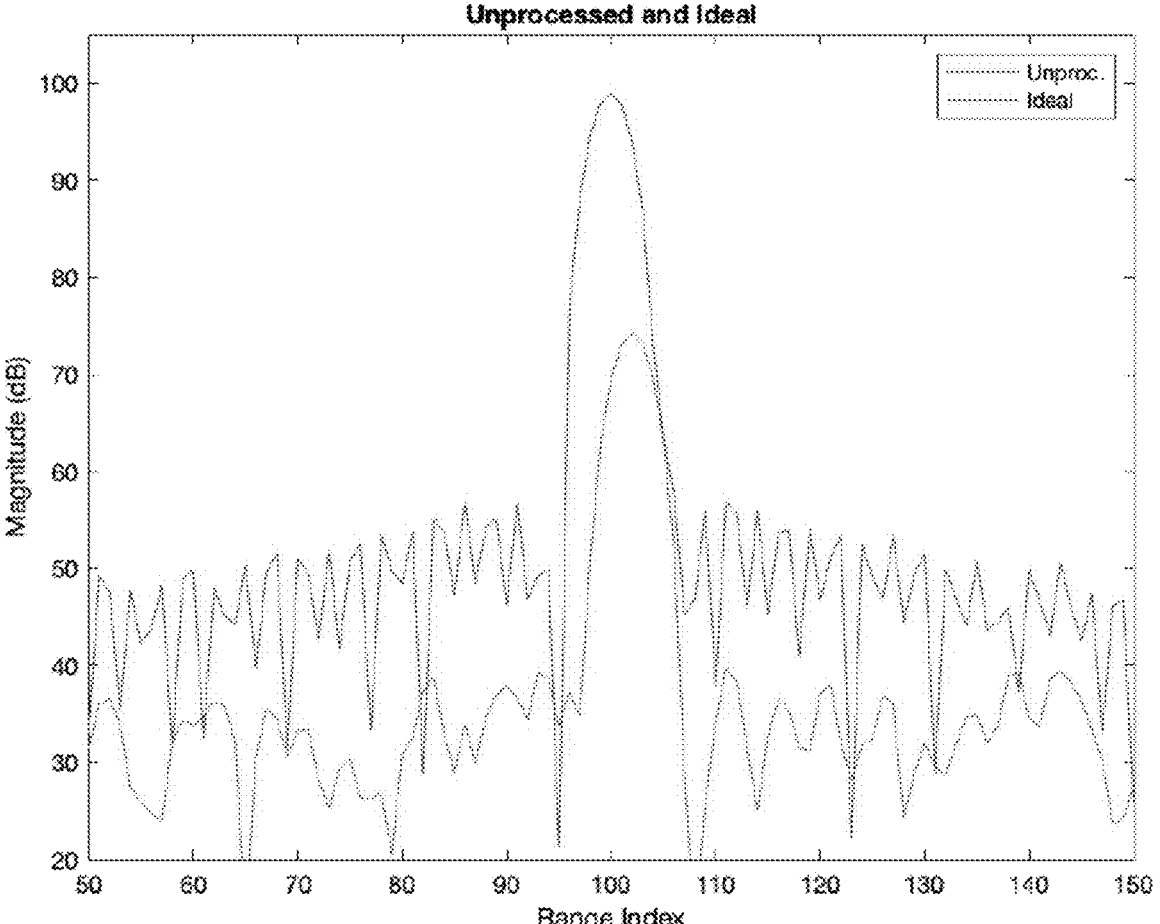
FIG. 6 is a simulation result showing unprocessed and ideal matched filter output.

FIG. 6 is a simulation result showing unprocessed and ideal matched filter output. A first trace is the unprocessed radar returns after matched filtering. A second trace is the ideal result of processing, i.e., the matched filter output when the target at index 100 is removed.

Figure 7:
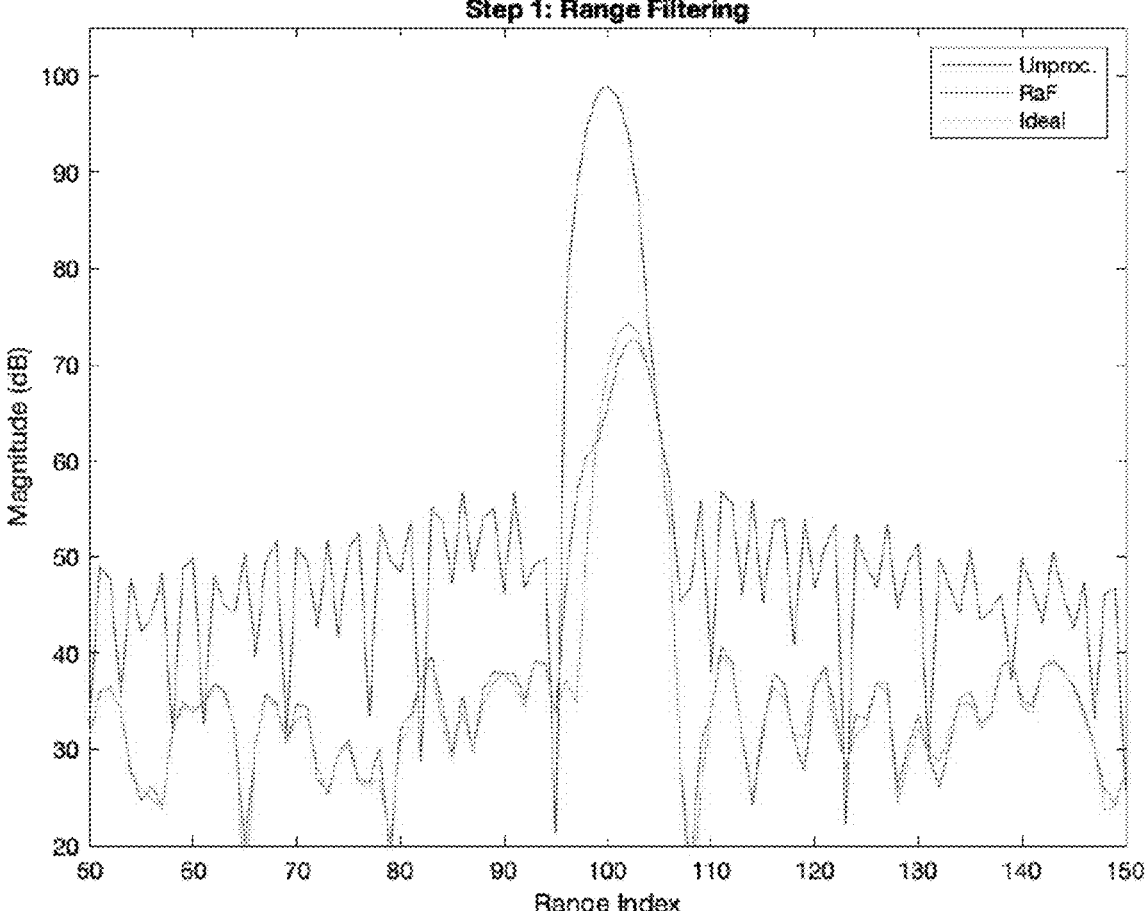
FIG. 7 is a simulation result showing unprocessed, ideal and range filtered matched filter output.

FIG. 7 is a simulation result showing unprocessed, ideal and range filtered matched filter output. A first step towards achieving an accurate reading of the masked target is application of range filtering on the large target at index 100. To clarify, this requires no knowledge except that there is a very large reflection at index 100 that may be masking smaller returns. The result of range filtering can be seen in FIG. 7. As this is a high noise environment a sizable noise residue remains.

A next step is to apply a Gram-Schmidt filter to the nearby columns of the convolution matrix. This is done so that the polarization filter to be formed on the noise peak polarization is unbiased by nearby targets.

Figure 8:
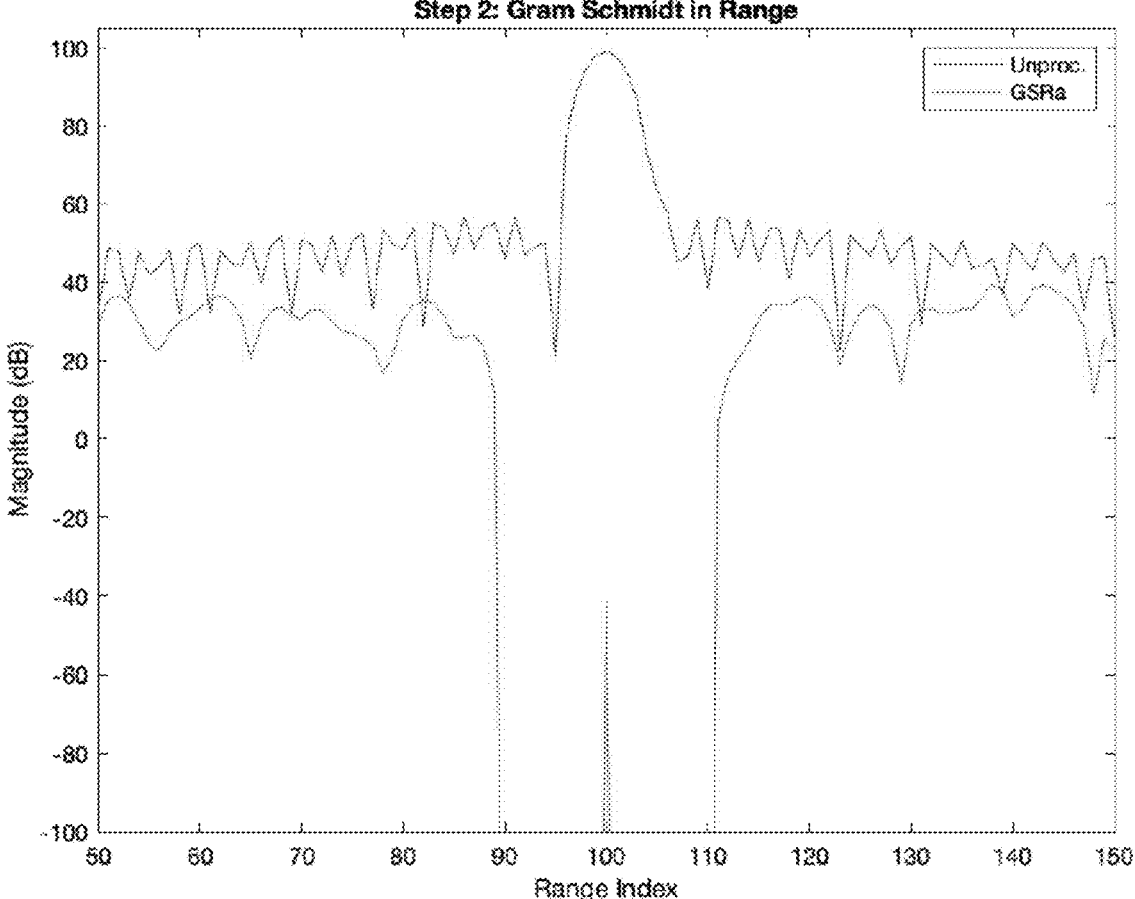
FIG. 8 is a simulation result showing an isolated noise peak.

FIG. 8 is a simulation result showing an isolated noise peak. In this simulation the range indices ten before and ten after the noise peak are filtered. The attenuation of the noise peak can be seen in FIG. 8. This attenuation does not alter its polarization though.

Figure 9:
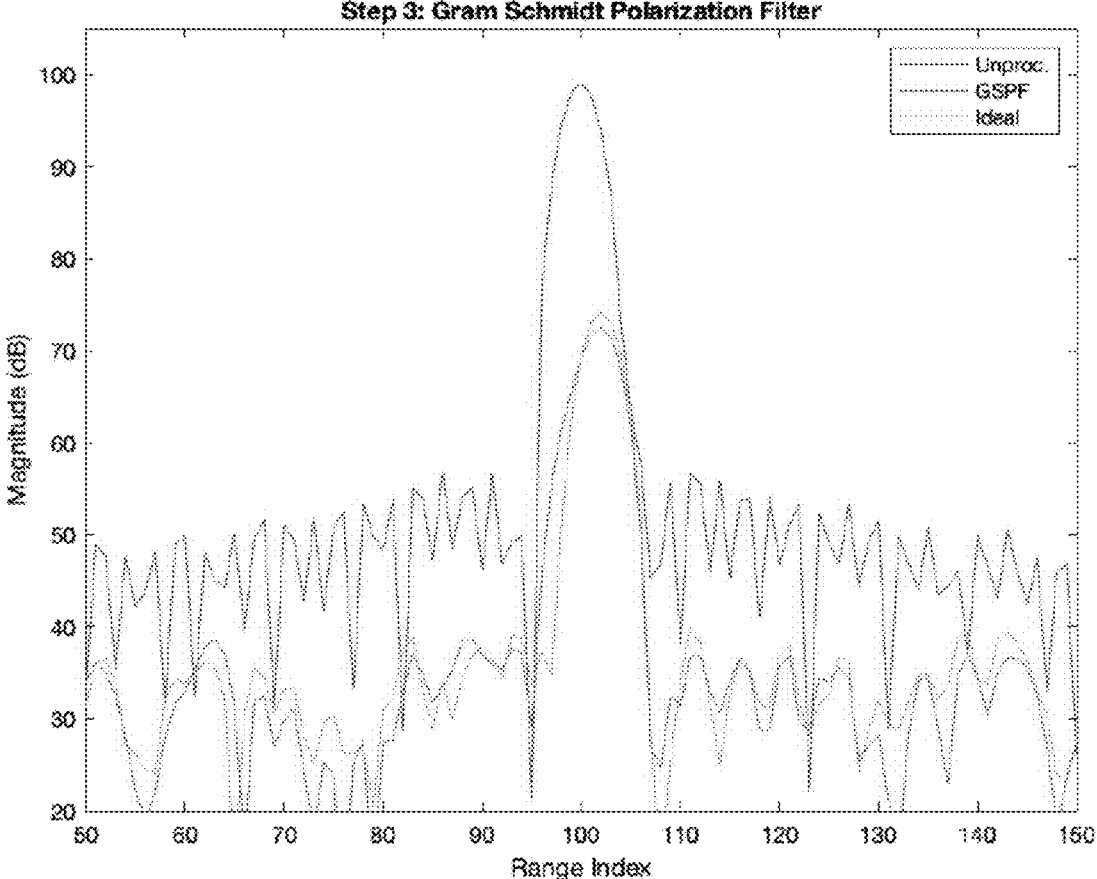
FIG. 9 is a simulation result showing completion of one processing cycle.

FIG. 9 is a simulation result showing completion of one processing cycle. To complete a processing cycle the polarization of the noise peak is taken from the previous step shown in FIG. 8, and a Gram-Schmidt polarization filter is applied to the range filtered returns.

Figure 10:
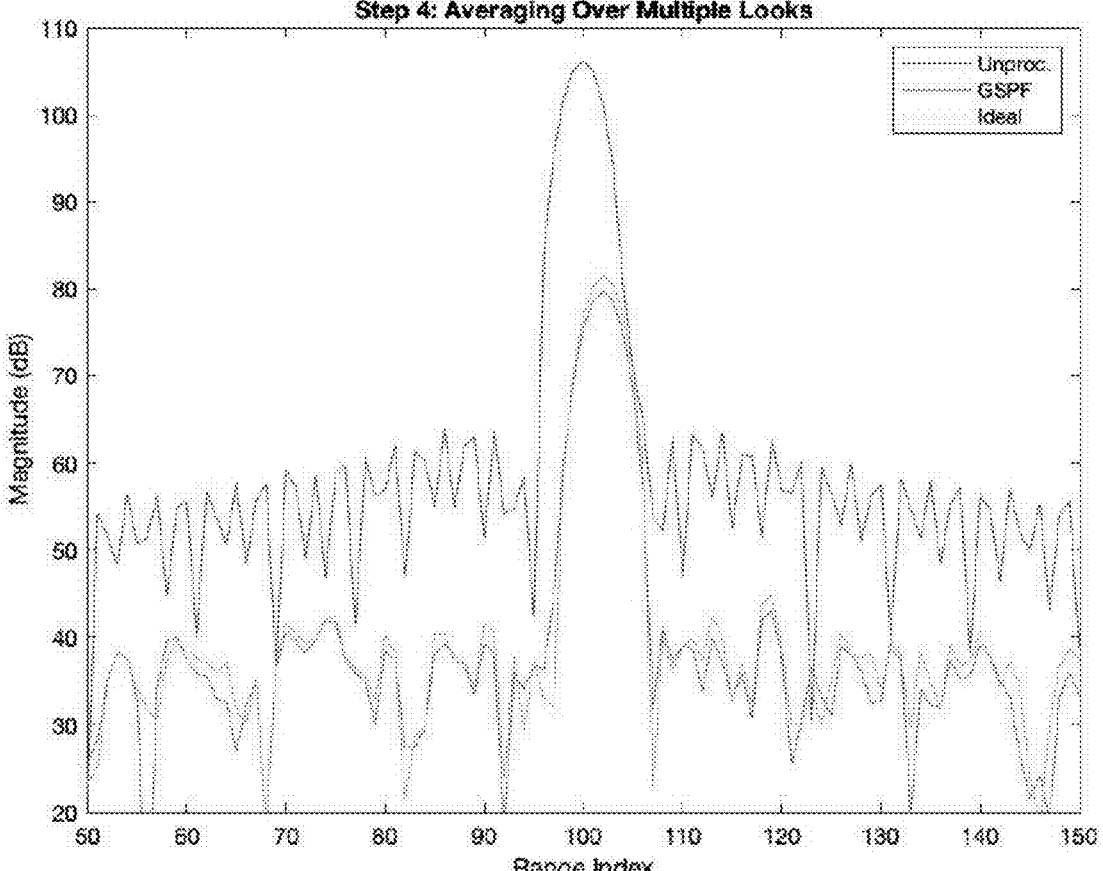
FIG. 10 is a simulation result showing repetition of 5 cycles.

FIG. 10 is a simulation result showing repetition of 5 cycles. The repetition is an attempt to average out the bias from the different polarization filters being applied. The process is repeated five times resulting in the output shown in FIG. 10. In this case the polarization readings were also brought into agreement with the ideal outputs as well.

Figure 11A:
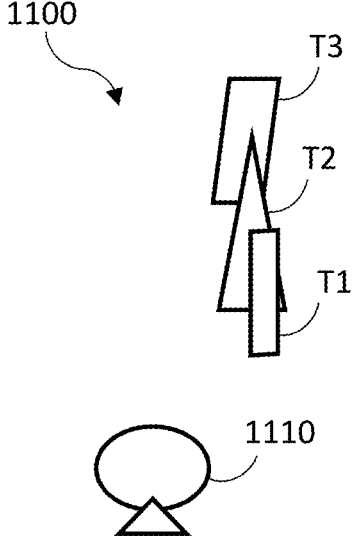
FIGS. 11A and 11B illustrate an experimental radar system implementing the filtering processes of the present disclosure.
Figure 11B:
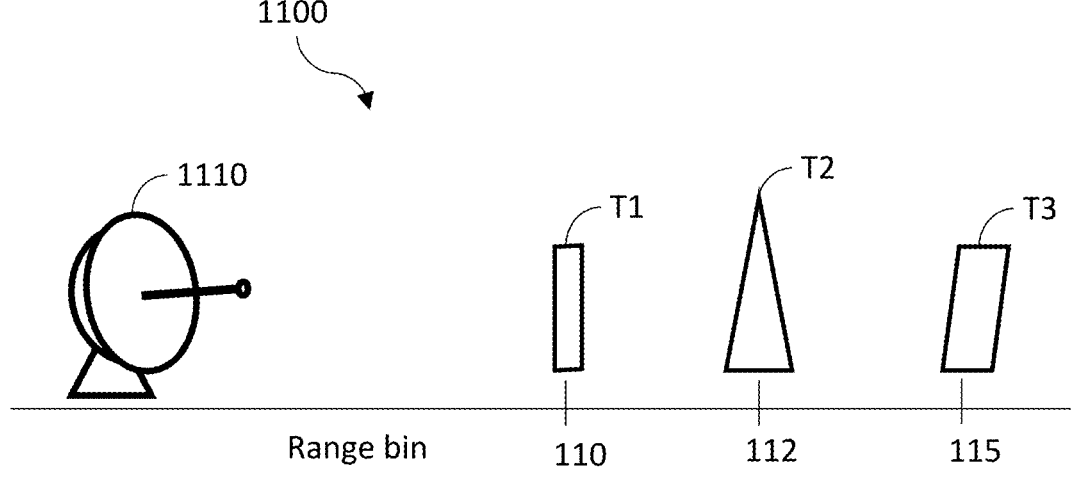

FIGS. 11A and 11B illustrate an experimental radar system 1100 implementing the filtering processes of the present disclosure.

Referring to FIG. 11A, three targets, T1, T2, and T3, are placed in approximately a straight line in front of a radar 1110. The radar 1110 uses a 100 MHz bandwidth continuous wave LFM. The channels were coded to enable full polarization measurements. All traces shown in measurements shown in FIGS. 12-15 are the sum of the four polarimetric channels.

When viewed from radar 1110, target T1, T2 and T3 are located in range bins 110, 112 and 115, respectively. Radar echo from target T3 will be obfuscated by targets T2 and T1; radar echo from target T2 will be obfuscated by target T1.

Referring to FIG. 11B, targets T1, T2 and T3 are placed at range bins 110, 112 and 115, respectfully. Measurements were taken with all different combinations of these targets. Measurements with targets alone provide prior polarization information that can be used to form polarization filters.

Figure 12:
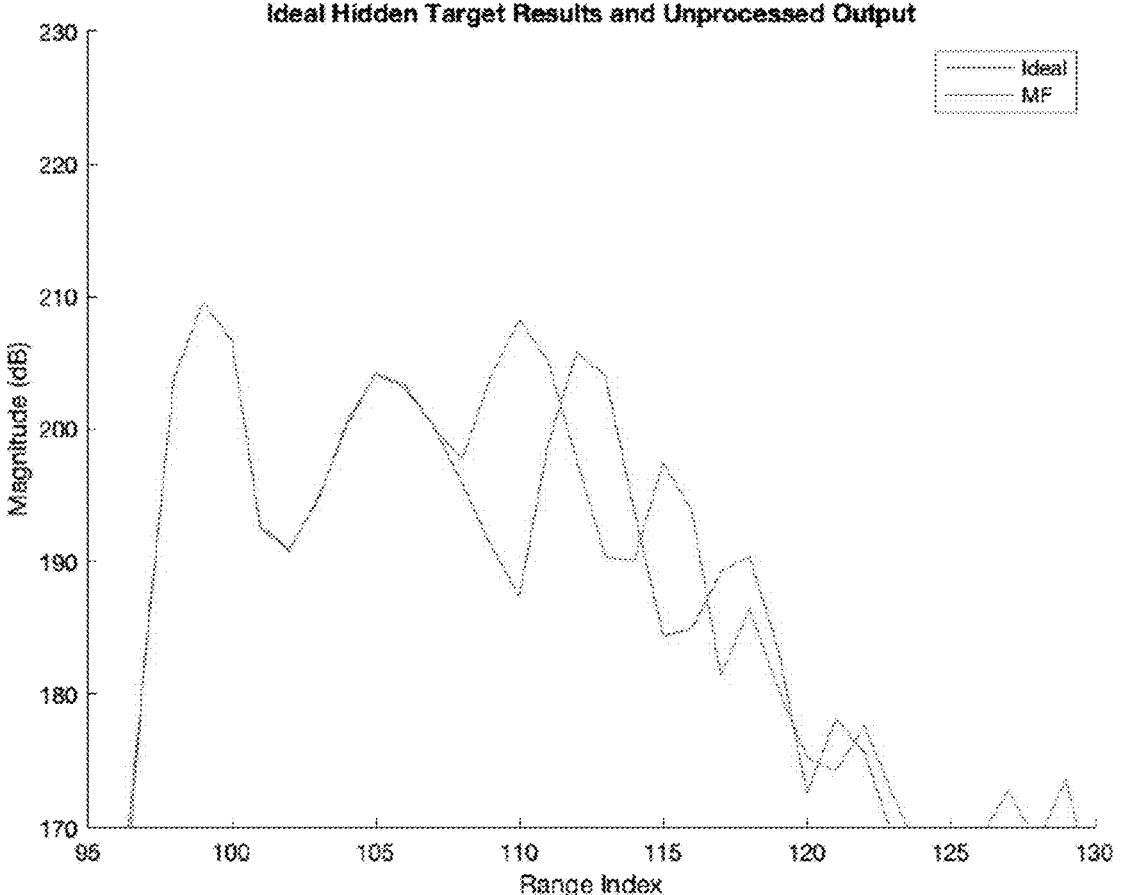
FIG. 12 shows measurements with the presents of an unprocessed middle target alone and all targets.

FIG. 12 shows measurements with the presents of an unprocessed middle target alone and all targets. These targets are located in range bins 110, 112, and 115. As can be seen in FIG. 12 with no processing (the second trace) the closest and furthest targets are visible but the middle target in completely undetectable. The first trace shows the middle target on its own, this represents the ideal results to be obtained in removing the first and third targets to make the second detectable.

Figure 13:
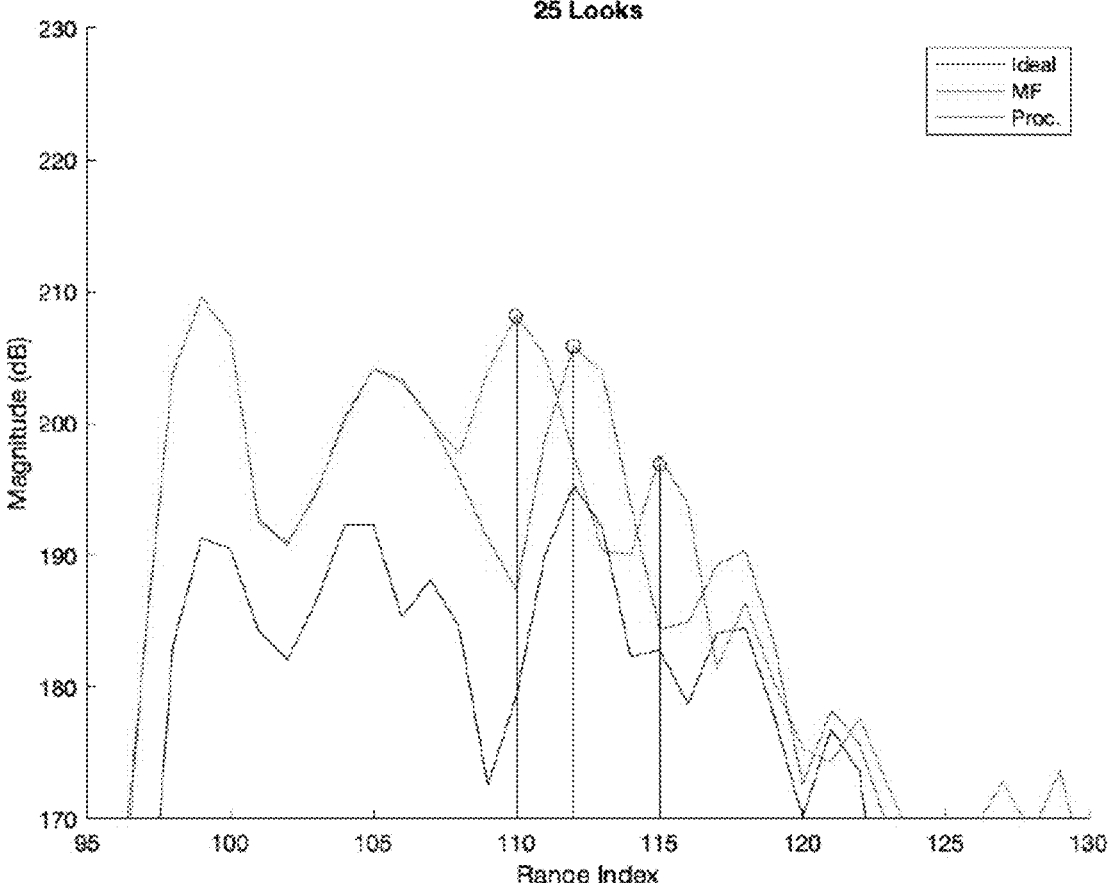
FIG. 13 shows measurements aggregated over 25 looks.

FIG. 13 shows measurements aggregated over 25 looks. In this experiment, the same traces are included with an additional trace showing the results of applying the processing depicted in FIG. 12 over 25 looks. Additionally the true location of the targets have indicators at their respective indices.

Figure 14:
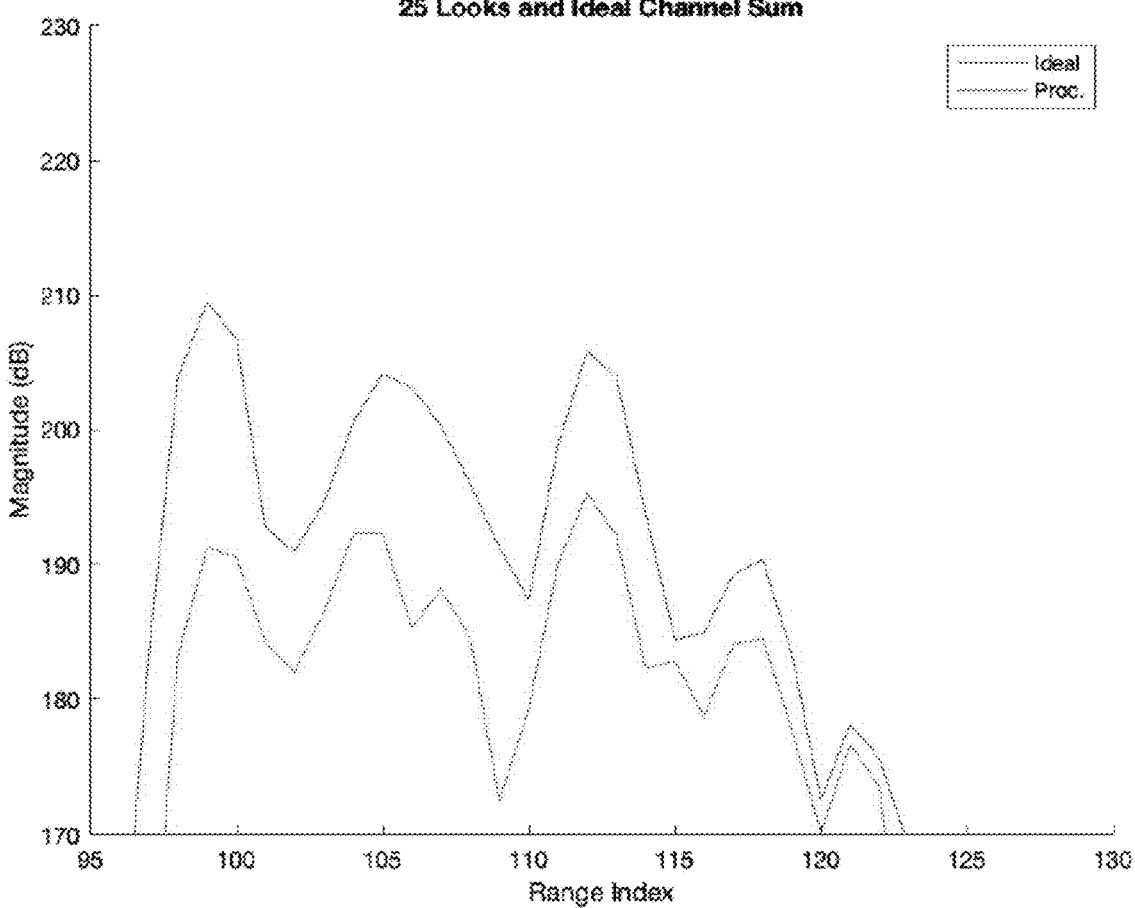
FIG. 14 shows measurements of ideal and processed results.

FIG. 14 shows measurements of ideal and processed results. This experiment gives a direct comparison between the ideal and processed results. The processed results attenuating the middle target becomes clearly visible.

Figure 15:
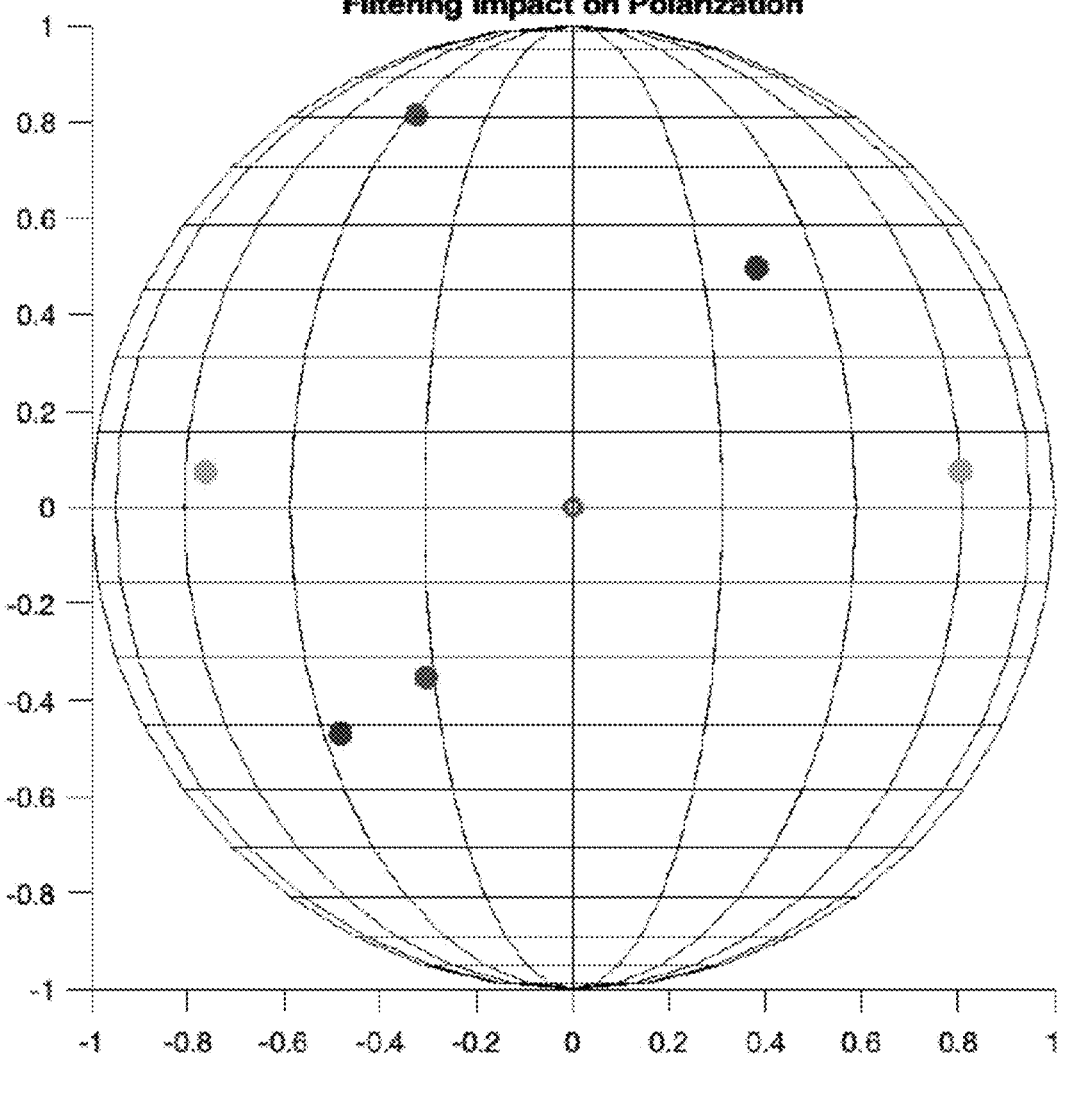
FIG. 15 shows polarimetric readings of the middle target alone, after processing and prior to processing.

FIG. 15 shows polarimetric readings of the middle target alone, after processing and prior to processing. This shows the polarimetric readings of the middle target's location when alone, after processing, and prior to processing. The processed results again do not attain the ideal, but move closer towards the desired readings.

In implementations, the combination of Range Filtering, Gram-Schmidt polarization filtering, and Gram-Schmidt filtering of convolution matrix columns is able to reveal targets that any of these methods in and of themselves could not. Additionally, the method outlined can theoretically enable the recovery of very near the true polarization information of revealed targets. While this method is not a single look it does not require very long dwell times as compared to something like Doppler processing. This method provides a way to utilize multiple looks and methods to greatly increase detectability of targets in zero Doppler readings.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

We claim:

1. An apparatus for detecting targets with radar signals, the apparatus comprising:

a receiver configured to receive a radar signal on orthogonally-polarized channels and generate a receiver return vector from the received radar signal;

a range filter configured to filter reflections in the receiver return vector at a selected range bin; and a polarization filter configured to filter an identified interference signal from a return of the range filter.

2. The apparatus of claim 1, further comprising a controller configured to:

repeat the filtering by the range filter and the polarization filter on a plurality of looks of the radar signals; and average returns of the polarization filter from the plurality of looks.

3. The apparatus of claim 1, wherein the filtering by the range filter comprises:

constructing a convolution matrix of a continuous wave transmission of the radar;

modeling a reflection of the continuous wave transmission off of reflectors organized in range with a multiplication of the convolution matrix with a first vector; and generate the range filter return by adding random complex quantities for noise to the model.

4. The apparatus of claim 3, wherein the convolution matrix is constructed based on complex baseband samples of the continuous wave transmission.

5. The apparatus of claim 3, wherein the first vector is environmental reflection coefficients by sample delay.

6. The apparatus of claim 1, wherein the filtering by the polarization filter comprises:

estimating a polarization vector of the identified interference signal;

calculating a projection coefficient from the polarization vector at a sample of the range filter return; and generating an output of the polarization filter for the sample by taking an inner product of the interference vector normalized by the projection coefficient from the range filter return.

7. The apparatus of claim 1, further comprising a first matched filter configured to process the receiver return vector to select a range profile with initial target and/or clutter detections and determine the selected range bin.

8. The apparatus of claim 7, further comprising a second matched filter configured to filter a result of the range filter to expose noise artifacts at ranges suppressed by the range filter.

9. The apparatus of claim 1, wherein the polarization filter is configured to filter range bins adjacent to the selected range bin.

10. A system for detecting targets with radar signals, the system comprising:

a transmitter configured to transmit orthogonally-polarized incident radar signals;

a receiver configured to receive a radar signal on orthogonally-polarized channels and generate a receiver return vector having four elements representing four channels of a full-polarimetric radar reading;

a range filter configured to filter reflections in the receiver return vector at a selected range bin; and a polarization filter configured to filter an identified interference signal from a return of the range filter.

11. The system of claim 10, further comprising:

repeating the filtering by the range filter and the polarization filter on a plurality of looks of the radar signals; and averaging returns of the polarization filter from the plurality of looks.

12. The system of claim 10, wherein the filtering by the range filter comprises:

constructing a convolution matrix of a continuous wave transmission of the radar;

modeling a reflection of the continuous wave transmission off of reflectors organized in range with a multiplication of the convolution matrix with a vector representing environmental reflection coefficients by sample delay; and generate the range filter return by adding random complex quantities for noise to the model.

13. The system of claim 10, wherein the filtering by the polarization filter comprises:

estimating a polarization vector of the identified interference signal;

calculating a projection coefficient from the polarization vector at a sample of the range filter return; and generating an output of the polarization filter for the sample by taking an inner product of the interference vector normalized by the projection coefficient from the range filter return.

14. A method for detecting targets with radar signals, the method comprising:

receiving a radar signal on orthogonally-polarized channels by a receiver to generate a receiver return vector;

filtering reflections in the receiver return vector at a selected range bin by a range filter; and filtering an identified interference signal from a return of the range filter by a polarization filter.

15. The method of claim 14, further comprising:

repeating the filtering by the range filter and the polarization filter on a plurality of looks of the radar signals; and averaging returns of the polarization filter from the plurality of looks.

16. The method of claim 14, wherein the filtering by the range filter comprises:

constructing a convolution matrix of a continuous wave transmission of the radar;

modeling a reflection of the continuous wave transmission off of reflectors organized in range with a multiplication of the convolution matrix with a vector representing environmental reflection coefficients by sample delay; and generate the range filter return by adding random complex quantities for noise to the model.

17. The method of claim 14, wherein the filtering by the polarization filter comprises:

estimating a polarization vector of the identified interference signal;

calculating a projection coefficient from the polarization vector at a sample of the range filter return; and generating an output of the polarization filter for the sample by taking an inner product of the interference vector normalized by the projection coefficient from the range filter return.

18. The method of claim 14, further comprising a first matched filter configured to process the receiver return vector to select a range profile with initial target and/or clutter detections and determine the selected range bin.

19. The method of claim 18, further comprising a second matched filter configured to filter a result of the range filter to expose noise artifacts at ranges suppressed by the range filter.

20. The method of claim 14, wherein the polarization filter is configured to filter range bins adjacent to the selected range bin.

* * * * *